(12) United States Patent
Diederiks et al.

(10) Patent No.: US 9,591,717 B2
(45) Date of Patent: Mar. 7, 2017

(54) USER INTERFACE AND METHOD FOR CONTROL OF LIGHT SYSTEM

(71) Applicant: Koninklijke Philips N.V., Eindhoven (NL)

(72) Inventors: Elmo Marcus Attila Diederiks, Eindhoven (NL); Andres Antonio Lucero Vera, Eindhoven (NL); Tatiana Aleksandrovna Lashina, Eindhoven (NL)

(73) Assignee: PHILIPS LIGHTONG HOLDING B.V., Eindhoven (NL)

( * ) Notice: Subject to any disclaimer, the term of this patent is extended or adjusted under 35 U.S.C. 154(b) by 216 days.

(21) Appl. No.: 14/050,413

(22) Filed: Oct. 10, 2013

(65) Prior Publication Data

US 2014/0043791 A1 Feb. 13, 2014

Related U.S. Application Data

(63) Continuation of application No. 12/097,525, filed as application No. PCT/IB2006/054796 on Dec. 13, 2006, now Pat. No. 8,579,452.

(30) Foreign Application Priority Data

Dec. 22, 2005 (EP) .................................... 05112804

(51) Int. Cl.
*F21V 33/00* (2006.01)
*H05B 37/02* (2006.01)
(Continued)

(52) U.S. Cl.
CPC .......... *H05B 37/02* (2013.01); *G06F 3/0481* (2013.01); *G06F 3/04817* (2013.01);
(Continued)

(58) Field of Classification Search
None
See application file for complete search history.

(56) References Cited

U.S. PATENT DOCUMENTS 4,962,687 A * 10/1990 Belliveau et al. .......... 84/464 R
5,886,704 A 3/1999 Kang et al.
(Continued)

FOREIGN PATENT DOCUMENTS

| JP | 2005216534 A | 8/2005 | |
|---|---|---|---|
| WO | 2004100613 A1 | 11/2004 | |
| WO | WO 2004100613 A1 * | 11/2004 | ............. G06F 3/041 |

*Primary Examiner* — Sean Gramling

(57) ABSTRACT

An interface device for controlling light sources includes a target region; and a controller that associates a preset with an illumination region, and controls a light source in the illumination region when an indicator associated with the preset and illumination region is moved into the target region. The controller associates the preset with the illumination region when the preset is moved to an area of the interface device associated with the illumination region. The controller is further configured to change light attributes of light emitted from the light source when the indicator is moved across the target region, such as providing maximum intensity when the indicator is at the center of the target region. The light attributes include intensity, color, hue, saturation, beam direction and/or beam width of the light.

9 Claims, 2 Drawing Sheets

Figure 1:
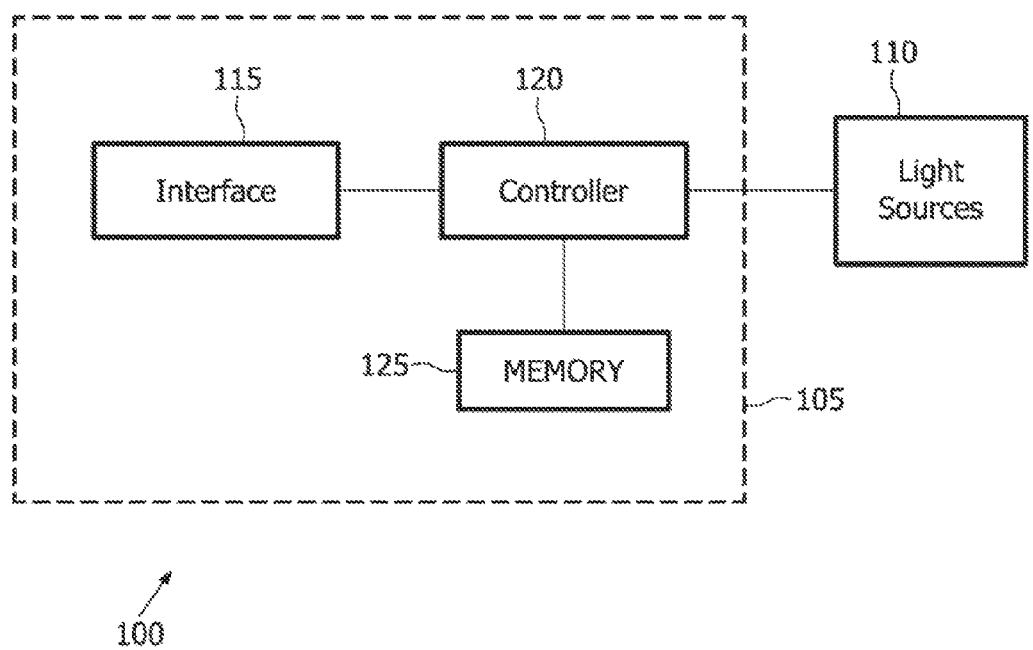

(51) Int. Cl.
*G06F 3/0481* (2013.01)
*G06F 3/0484* (2013.01)
*G06F 3/0488* (2013.01)

(52) U.S. Cl.
CPC ...... *G06F 3/04847* (2013.01); *G06F 3/04886* (2013.01); *H05B 37/0245* (2013.01)

(56) References Cited

U.S. PATENT DOCUMENTS

| | | |
|---|---|---|
| 5,969,485 A | 10/1999 | Hunt |
| 2003/0057887 A1 | 3/2003 | Dowling et al. |
| 2006/0052884 A1* | 3/2006 | Staples .............. G05B 19/0426 700/83 |

* cited by examiner

USER INTERFACE AND METHOD FOR CONTROL OF LIGHT SYSTEM

The present invention relates to a user interface, such as a graphic user interface (GUI) for control of light systems and methods, especially to systems and methods for selecting a desired light source(s) and preset(s) to provide desired illumination in a desired region(s).

Controlling light systems based on user preferences (e.g. colors, intensity, special effects, etc.) is presently becoming more popular for creating artificial atmosphere in private dwellings and public places including retail establishments that typically use lighting professionals to design proper lighting to provide the proper atmosphere and light accent. Current light controllers are costly and complex and require professionals to develop and implement such controls. One example of a light system controller is disclosed in U.S. Patent Application Publication No. US 2003/0057887 A1, which is incorporated herein by reference in its entirety, where a real environment, such as a stadium, is modeled or mapped in a virtual environment using a drag and drop interface including the placement of virtual light sources to establish correspondence with real light sources. Such a virtual representation of a real environment is then used to control lights in the real environment. Other complicated controls for exploring light spaces is disclosed in U.S. Pat. No. 5,886,704, which is incorporated herein by reference in its entirety, where a system facilitates graphical light design by generating different light options for a scene and organizing all images to simplify the light selection for a user for combining images to create a final image.

Consumers are also interested in having proper lighting atmospheres in their homes that can be easily controlled to provide such desired lighting atmospheres and the market is responding. For example, International Publication No. WO 2004/100613 A1, which is incorporated herein in its entirety, discloses a user interface for controlling light emitting diodes (LEDs) having a touch screen that may be a resistive touch screen or a capacitive one, where the user provides a processor desired light spectral output for controlling the LEDs. Although such a user interface is a big improvement as compared to costly and complex professional light controllers, there is still a need for further user-friendly interface devices that provide sense and simplicity in the control of various light sources.

Accordingly, an interface device (100) for controlling light sources is provided that includes a target region; and a controller configured to associate a preset with an illumination region; and to control a light source in the illumination region when an indicator associated with the preset and illumination region is moved into the target region. The controller associates the preset with the illumination region when the preset is moved to an area of the interface device associated with the illumination region. The controller is further configured to change light attributes of light emitted from said light source when said indicator is moved across the target region. The light attributes include intensity, color, hue, saturation, beam direction and/or beam width of the light. The controller may further be configured to change intensity of light emitted from the light source when the indicator is moved across the target region, where the intensity is maximum when the indicator is at the center of the target region.

Areas of the target region may also be associated with different colors, where the controller is configured to change the color of light emitted from the light source when the indicator is moved across such areas. In addition, the controller may also be configured to display an indication of the illumination region, the target region, and/or various presets and/or a drop menu of presets. Illustratively, the indicator is an icon and/or a pointer displayed on the interface device (100) which may include a touch sensitive screen and/or a capacitive or resistive disc. The preset may include a selected set of light sources and selected attributes associated with lights emanating from the selected set of light sources.

Figure 2A:
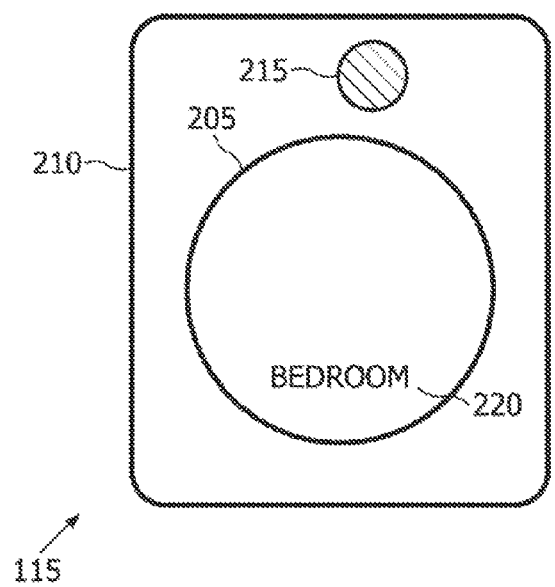
Figure 2B:
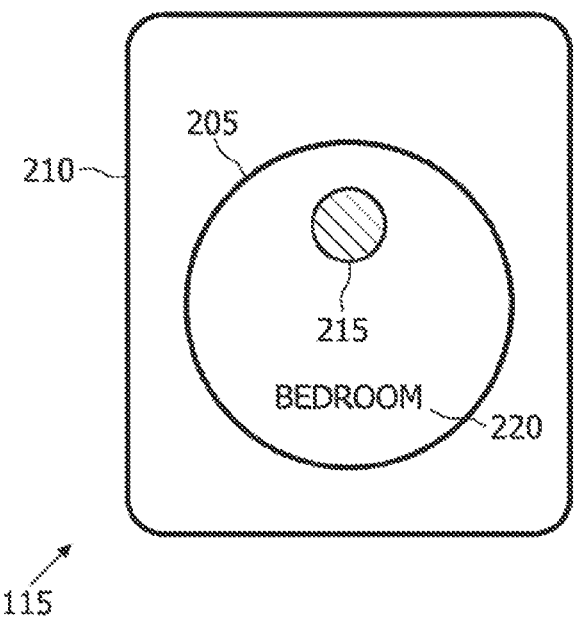
Figure 2C:
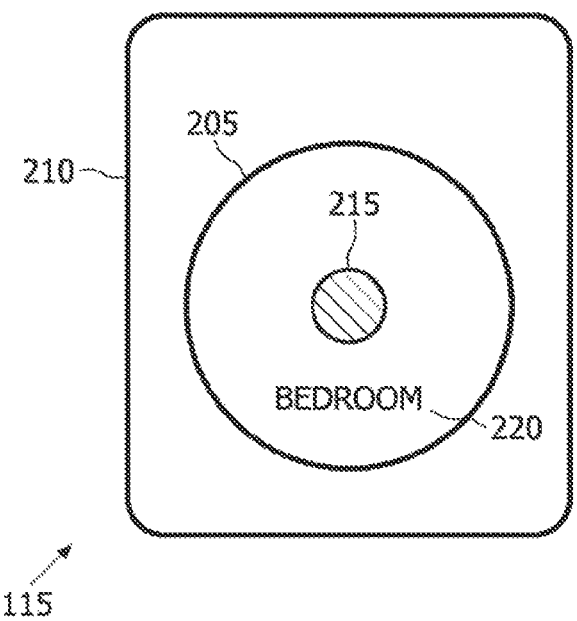

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention. These and other features, aspects, and advantages of the apparatus and methods of the present invention will become better understood from the following description, appended claims, and accompanying drawings where:

FIG. 1 shows a block diagram of a lighting system having a user interface according to one embodiment of the present invention; and FIGS. 2A-2C show the user interface of FIG. 1 in greater detail.

The following description of certain exemplary embodiments is merely exemplary in nature and is in no way intended to limit the invention, its application, or uses.

FIG. 1 shows a block diagram of a lighting system 100 having a user-interface device 105 for controlling light fixtures or sources 115 to provide light of desired attributes, including desired intensity, color, hue, saturation, beam direction, beam width and the like. The light fixtures may include motors that are controlled by the user-interface device 105 for pan and tilt operation for example. The light sources may be any kind of controllable light source with associated ballasts or control electronics, such as incandescent, fluorescent, halogen, high intensity discharge (HID), LEDs and the like, where LEDs where are particularly well suited for providing color-changeable light.

Each lighting fixture or source, or set of lighting fixtures or sources, or lighting systems may have further circuitry and memory to store and provide their own identifying information which is known or communicated to the interface device in response to a request signal therefrom, for example, so that any desired light fixture may be addressed and controlled by the controller 120 in response to user input to the user interface 115.

As shown in FIG. 1, the user-interface device 105 includes a user interface 115 which will be described in greater detail in connection with FIG. 2. The user interface 115 is coupled to a processor or controller 120 configured to control light fixtures or sources 115 which may be located anywhere, alone or in sets, in one or various rooms and the like. A memory 125 is coupled to the controller 120 and is capable of storing necessary instruction and data, such as operating instructions to be executed by the controller as well as presets that include particular combinations of light attributes to be associated with the light sources 110 for providing lights in accordance with such presets. It should be noted that the interconnection among user interface 115, the controller 120, memory 125 and the light sources may be via any communication means, such as wired or wireless communication directly or through a network. Short range wireless communication such as using Zigbee™ or Bluetooth™ protocols is well suited particularly between the controller 120 and the light sources 110, as well as between the user interface 115 and the controller 120 in the case where the two are implemented as separate devices.

As is well known, transceivers for transmitting and receiving signals through wires or a wireless interface, may also be provided as needed, including antennas in the case of wireless communication. Modulators, demodulators and filters may also be used to extract information or control signals from carrier signals for further processing.

The presets may be organized in any desired way, such as presets for romantic, reading, TV watching modes and the like. The presets may be predetermined and stored in the memory and prepared by lighting professionals, including the manufacturer/developer of the user interface device 105. Of course, the present may be programmable by anyone including users who may change them as desired or create and store new presets in the memory 125.

The controller 120 may be any type of controller or processor, such as those described in U.S. 2003/0057887, that is capable of providing output or control signals in response to input signals from the user interface 115, executing instruction stored in the memory 125, which may be any, type of memory, RAM, ROM, removable memory, CD-ROM, and the like, also as described in U.S. 2003/0057887. It should be understood user interface 115, the controller 120, memory 125, although shown as part of the user interface device 105, may be separate units alone or in combination with other units. For example, the controller 120 and memory 125 may be part of a personal computer, and the user interface 115 a separate or integrated unit therewith. The user interface device 105 itself may be implemented in a personal computer or any device capable of accepting user input, storing data and providing control signals, such as remote controllers, personal digital assistants (PDAs), cell phones and the like.

FIGS. 2A-2C show one embodiment of the user interface 115 having a target region 205 which may be a resistive or capacitive touch screen, for example. Alternatively the target region 205 as well as regions exterior thereto may be touch sensitive display 210 similar to those in PDA's controllable via pointers, such as pointing devices or one's finger.

In use, a user selects a preset which may be displayed on the screen 210 as an icon 215, after selection from a drop menu for example, or from a plurality of icons displayed on the screen 210. Illustratively, one icon 215 is displayed and the user associates the icon 215 with a preset selected from a drop menu for example to the icon 215, such as a romantic preset or a reading preset for example.

Further, the user selects and associates a specific light fixture or source 110 with the icon 215. Illustratively, the user selects a desired illumination region of a room, dwelling or building with the icon 215, and the processor or controller 120 automatically associates light fixtures in the selected desired illumination region with the icon 215 using relevant information stored in the memory 125, such as a map of the environment and, e.g., rooms in a house, and locations and types of light fixtures in each room having unique addresses for identification, addressing and control. Such a map may be created by any suitable means, such as described in U.S. 2003/0057887 A1.

For example, the user may choose a romance as the preset and the bedroom as the illumination region. Alternatively, the user may choose a reading preset and a reading chair or a sitting room as the illumination region. In one embodiment the name 220, or a representative location icon (such as an icon in the shape of chair, bed etc.) of the selected illumination region may be displayed on the screen 210, such as in the target region 205, for example. User selection of on-screen icons, representations or other items, whether directly on the screen or through other means such as drop-down menus for example, may be by any suitable means, such as by a mouse click or a double mouse click. Illustratively, selection is performed by pointing using a pen, pointing device or a finger in the case the screen is the touch screen 210.

Relations between two user interface objects, such as between presets and illumination regions, or between presets and illumination regions and the icon 215, may also be by any suitable means such as by dragging one object close or over another object, which would result in a certain action, e.g., the above-described association, similar to dragging a file over a trash bin results in file deletion. Similarly the icon 215, which may also be in the form of text or text representing a light setting, can be dragged onto another user interface object, which represents a certain area in a room/location, which would result in activating this preset in the corresponding location. Feed-forward in such a dragging action may also be provide to show the relationship between the two interface objects, e.g., by highlighting the user interface object onto which the dragged object can be dropped.

The icons 215, having been associated with a particular preset and illumination region, can be dragged back and forth like a slider, for example, over a designated area of the screen 210, to set a certain value on a scale such as intensity, color and any other light attribute.

As described, various actions such as the three above-mentioned actions are combined in one single dragging action to control a light system. The user can select a lighting preset by pointing at it (for instance by putting one's finger down on a touch screen), assign it to a specific location by dragging it onto the designated area, such as the target region 205 of the on the screen 210, and once the preset icon is on the target region 205, set attributes of light emitted from the selected light sources associated with the icon 215, such as the intensity of the preset, by continuing to drag the icon 215 more towards the centre of target region 205, for example. The actions can be stopped by releasing the preset icon (for instance by lifting one's finger from a touch screen), resulting in that preset being assigned to that specific area at a specific intensity. Illustratively, when the user selects a preset, the areas where the preset can be applied are highlighted.

As shown in FIG. 2A, the icon 215 is associated with a particular preset, where the icon 215 may be configured to provide an indication of the preset via textual or graphical representation. For example, if the romance preset is selected and associated with the icon 215, then the text "romance" or any other representative text may be included in the icon. Alternatively or in addition, the shape and/or color of the icon may be changed to a representative shape, such as the shape of a heart which may be pink, bright red or the like. Similarly, a textual or graphical representation of the selected illumination region may also be indicated on the screen 210, such as in the target region 205, as shown by the indication of "bedroom" 220 shown in FIG. 2A. Again, instead of this text, a graphical shape of a bed may be displayed. Of course, any textual or graphical representation may be programmable by the user which may also be through navigation and selection from drop-down menus for example.

FIG. 2B shows the icon 215 that is associated with the particular preset, which may be programmed and modified by the user to be any desired light source or sources in the illumination area such as the bedroom, is dragged into the target area 205. The location of the icon 215 within the target area is associated with a particular value or level of the selected preset or light attribute. For example, if the selected preset includes light intensity, then dragging the icon 215 in the target area 205 changes the intensity of the preset. Illustratively, the light intensity is at 20% in the case where the icon 215 is at the position shown in FIG. 2B, which is inward from the target region border at approximately 20% of the target region's radius.

FIG. 2C shows the icon 215 being in the center of the target area 205, which in the case of intensity, sets the associated lights at maximum intensity, where dimming is achieved by moving away from the center. Of course, many variations may be devised by those skilled in the art in view of the present description, such as having a mode, which may be the default mode which of course is programmable by the user, that turns the lights on at maximum intensity where the icon 215 is automatically moved to the center of the target area 205, thus allowing for dimming by dragging the icon 215 away from the target area center.

As the icon 215 is dragged toward the target area center and the intensity of light emanating from the associated light source(s) increase, an indication of such increased may be provided on the screen 210, such as via a scale or via changing the intensity of a designated screen region, such as the target area 205. Illustratively, when the icon 215 is at the target area center, the target area is brightest, or the center of the target area is brightest and region away from the target area center have gradually decreasing brightness thus providing a further indication that moving the icon 215 to regions away from the target area center will result in dimming of the associated light source(s). The color of the target area 205 may be the same color as the light emanating from the light source(s). For example, if the light color is red, then the target area center is brighter red than the rest of the target area.

Of course, other light attributes may also be represented by appropriate indications on the screen 210. For example, if the selected preset includes changeable color, then the target region 205 may be different colors, such as by having discrete colored regions. Alternatively, a rainbow type of representation or a color circle/wheel may be provided so that when the icon is dragged over the regions of different colors, the color of the associated light source(s) change in accordance with the color of the region over which the icon resides.

The interface device 100 allows the user to select a preset, appoint it to a specific area/object, and set an attribute, e.g., intensity of this preset. Thus the user can select light presets, to appoint a preset to specific areas in a location and, set the intensity of this preset, all in a single, simple action. The user can easily select modes of operation, such as intensity, color, presets and so on, such as via a dragging of object for association and controlling light sources to change attributes of light emanating therefrom. Thus, an elegant user-interface is provided that allows laymen to easily control any light source in a lighting system to illuminate any desired regions with any desired type of illumination having any desired attribute selectable by the user or in accordance with presets which may be professionally designed and stored in, or available to, the user interface such as through downloads from a remote server connected through a network, such as the Internet for example.

Finally, the above-discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended spirit and scope of the invention as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) each of the disclosed elements may be comprised of hardware portions (e.g., discrete electronic circuitry), software portions (e.g., computer programming), or any combination thereof.

The invention claimed is:

1. An interface device for controlling at least one light source in an illumination region, said interface device comprising:
   a display comprising a screen, resistive disc, or capacitive disc;
   a target region displayed on the display, the target region comprising an outer edge and a center region;
   an indicator displayed at a location on the display, wherein the location of the indicator on the display is configured to be reversibly moveable from outside the target region to a plurality of different locations inside the target region by a user touching the display; and
   a controller configured to adjust an attribute of the at least one light source in the illumination region based on movement of the indicator from outside the target region to one of the plurality of different locations inside the target region by the user, wherein each of the plurality of different locations inside the target region is associated with a different preset adjustment of the attribute, and further wherein the amount of the adjustment of the attribute increases from a minimum at the outer edge to a maximum at the center region.

2. The interface device of claim 1, wherein said attribute comprises at least one of intensity, color, hue, saturation, beam direction, and beam width.

3. The interface device of claim 1, wherein said attribute is an intensity of light emitted from said at least one light source.

4. The interface device of claim 3, wherein said intensity is at a maximum level when said indicator is at the center region of said target region.

5. The interface device of claim 1, wherein said attribute is color, and wherein said controller is configured to change a color of light emitted from said at least one light source when said indicator is moved.

6. The interface device of claim 1, wherein said controller is further configured to display an indication of said illumination region.

7. A method for adjusting at least one light source in an illumination region using an interface device, the method comprising the steps of:

displaying, on a display of the interface device, a target region and an indicator, wherein said display is a screen, a resistive disc, or a capacitive disc, and further wherein the indicator is associated with said illumination region, and wherein the target region comprises an outer edge and a center region;

receiving, by the user touching the display, user input comprising movement of the indicator from outside the target region to one of a plurality of different locations inside the target region of said interface device; and adjusting an attribute of the at least one light source in response to said user input moving the indicator from outside the target region to one of the plurality of different locations inside the target region, wherein each of the plurality of different locations inside the target region is associated with a different preset adjustment of the attribute, and further wherein the amount of the adjustment of the attribute increases from a minimum at the outer edge to a maximum at the center region.

8. The method of claim 7, wherein said attribute is a coor of light, the method further comprising the step of:

changing a color of light emitted from said at least one light source when said indicator is moved to one of the plurality of different locations inside the target region.

9. The method of claim 7, further comprising the step of displaying an indication of said illumination region.

* * * * *